United States Patent [19]

Crump et al.

[11] Patent Number: 4,850,392

[45] Date of Patent: Jul. 25, 1989

[54] DOUBLE POPPET RELIEF VALVE

[75] Inventors: J. Bradley Crump, Duncan; Johnny R. Wells, Comanche; Phillip N. Naegele, Duncan, all of Okla.

[73] Assignee: Halliburton Company, Duncan, Okla.

[21] Appl. No.: 193,859

[22] Filed: May 13, 1988

[51] Int. Cl.[4] ............................................. F16K 47/08
[52] U.S. Cl. .................................... 137/513; 137/528; 251/120; 251/118
[58] Field of Search ............... 137/455, 513, 528, 613, 137/614.2, 511; 251/118, 120, 122

[56] References Cited

U.S. PATENT DOCUMENTS

| | | | |
|---|---|---|---|
| 767,098 | 8/1904 | Belden | 137/511 |
| 2,574,414 | 11/1951 | Ragland | 137/528 X |
| 2,727,532 | 10/1955 | Sousa et al. | 137/528 |
| 3,508,577 | 4/1970 | Vincent et al. | 137/528 |
| 3,521,853 | 7/1970 | Gillis, Jr. et al. | 251/122 |
| 3,802,660 | 4/1974 | Fletcher et al. | 251/122 |
| 3,951,379 | 4/1976 | Cornelius | 251/118 |
| 4,243,202 | 1/1981 | Inamura | 251/122 X |
| 4,630,642 | 12/1986 | Detweiler | 137/614.2 X |

Primary Examiner—John Rivell
Attorney, Agent, or Firm—James R. Duzan; Neal R. Kennedy

[57] ABSTRACT

A double poppet area relief valve for use in a well treatment pumping system. The relief valve includes a housing comprising a cylinder and a body. A piston is disposed in the cylinder and has a push rod extending therefrom into the body. A double poppet assembly is attached to an end of the push rod. In one embodiment, the double poppet assembly includes a sealing poppet assembly for sealing with a poppet seat when in a closed position and an orificing poppet assembly for providing throttled fluid flow through the body when in an open position. In a second embodiment, a ring holder is attached to the push rod and has a sealing poppet ring and an orificing poppet ring disposed thereon. The sealing poppet ring and the orificing poppet ring function in a manner similar to the sealing poppet assembly and orificing poppet assembly, respectively, of the first embodiment. With both embodiments, wear is minimized on the sealing poppet so that the valve will reseal on the poppet seat when closed after usage.

19 Claims, 4 Drawing Sheets

DOUBLE POPPET RELIEF VALVE

BACKGROUND OF THE INVENTION

1. Field Of The Invention

This invention relates to relief valves for providing pressure relief in a pumping system during treatment of wells, and more particularly, to a relief valve having a double poppet, one poppet portion for orificing and another poppet portion for sealing.

2. Description Of The Prior Art

In the hydraulic fracturing of oil and gas wells, fluids are used to which proppants have been added. The recent trend has been to use higher and higher proppant concentrations to increase production as much as possible. As the proppant concentration increases, so do the difficulties associated with pumping the fluid. One problem is that of undesirable pressures which may be a result of a screenout, mechanical failure or human error. These undesirable pressures can cause damage to the well formation, the well casing and tubing therein, and the pumping equipment, in addition to being a possible hazard to personnel.

A screenout occurs when the fracture in the formation will physically not accept any more proppant. This results in a pressure rise measurable at the surface. This increase in pressure, or pressure "spike", can occur over just a few seconds, and increases in the range of 600 to 4000 psi are not unusual. These pressure spikes occur too rapidly for operators to react. Therefore, a pressure relief device is required in the pumping system.

Other undesirable increases in pressure may occur due to a malfunctioning pressure gauge. Also, valves in the manifolding or on the well head may be improperly in a closed position or may be closed during the pumping operation. Again, a pressure relief device must be provided for the system. These pressure related problems can also occur when merely pressure testing lines.

Pressure relief valves have been used in such pumping systems for some time and are well known. Typically, the relief valve is connected to the discharge line of the pump, and the relief valve consists of a housing structure, a seat, a poppet and some means of applying force, such as pneumatic or hydraulic pressure source. The poppet generally performs two functions. The first is a sealing function, and the second is an orificing function. Such a previously known relief valve, which is described in more detail herein, has a problem in that after opening, it will not reseal. This is due to the fact that when throttling the fluid during the orificing function of the valve, the proppants in the fluid, which are extremely abrasive, erode the sealing components. Typically, this erosion causes the valve to leak after only one operation. Such erosion can occur over a time span of just a few seconds. Obviously, if the valve will not reseal, it will leak, and this leakage is undesirable because it creates the potential for well flowback which can result in loss of fracturing fluid and is potentially hazardous.

The result is that the valve should be repaired after every operation. This is not always done, and at times, the job is continued at a slower rate with the relief valve blanked off because of the leakage. This is obviously undesirable because this last pumping stage is done without any relief valve in the system.

Previous attempts to solve this erosion problem with relief valves have been mainly concentrated on improvements in valve materials, such as using hardened materials and the like. Such hardened materials are generally expensive, and even so, the use of such materials has had little success because of the kind of fluids used in oil and well fracturing operations.

The relief valve of the present invention has a double poppet means with separate orificing and sealing poppet means. When the valve is in the open position, the orificing means performs the throttling or orificing function where high fluid flow rates are present, and the sealing poppet means is kept in a zone of low pressure drop and low fluid velocity. While open, the orificing poppet means and the adjacent orificing surface sustain the erosion, and the sealing poppet means sustains relatively little wear. This concept, used in conjunction with wear-resistant materials, provides extended life for the sealing components. The major advantage is that the valve may be operated several times without requiring repair.

SUMMARY OF THE INVENTION

The double poppet relief valve of the present invention generally comprises housing means for connecting to a pumping system and double poppet means disposed in the housing means for resealing when in a closed position and for throttling fluid flow through the housing means when in an open position. The relief valve may further comprise piston means for providing a force on the double poppet means in response to a pressure from a pressure source. The force acts in a direction tending to close the double poppet means.

The double poppet means preferably comprises sealing poppet means for sealingly engaging a poppet seat located within the housing means when in the closed position and orificing poppet means for throttling fluid flow adjacent an orificing surface located in the housing means when in the open position. The sealing poppet means is spaced from the poppet seat when in the open position such that wear on the sealing poppet means is minimized.

In the preferred embodiment, the relief valve further comprises an inner surface located in the housing means such that an outer surface of the orificing poppet means passes this inner surface in close, spaced relationship thereto as the double poppet means is moved from the closed position to the open position. This insures that the double poppet means will be fully opened quickly, again minimizing wear on the sealing poppet means. Preferably, the orificing surface and the inner surface are defined on an orificing wear insert disposed in the housing means.

The relief valve comprises a push rod slidably disposed in the housing means. In a first embodiment, the sealing poppet means is characterized by a sealing poppet body attached to the push rod, and the orificing poppet means is characterized by an orificing poppet body attached to the push rod. Preferably, the sealing poppet body and orificing poppet body are spaced from one another, and a poppet spacer may be disposed therebetween.

In another preferred embodiment, a ring holder is attached to the push rod. In this embodiment, the sealing poppet means is characterized by a sealing poppet ring disposed around the ring holder, and the orificing poppet means is characterized by an orificing poppet ring disposed around the ring holder. Again, the sealing poppet ring and orificing poppet ring are preferably spaced from one another, and a ring spacer may be disposed around the ring holder and between the sealing and orifice poppet rings.

The double poppet relief valve will open when the pressure acting on the inlet area exerts a force exceeding that of the pressure source acting on the piston means. Once the relief valve is opened, orificing is carried out by the orificing poppet means with minimal wear on the sealing poppet means. Accordingly, when the valve is closed, the sealing poppet means will reseal on the poppet seat, thus allowing many operations. The orificing poppet means may have a larger cross-sectional area than the sealing poppet means so that the system pressure must decrease by a corresponding amount before the valve will reclose. Alternately, the sealing poppet means and orificing poppet means may be the same size so that the system pressure does not need to decrease before closing.

An important object of the present invention is to provide a relief valve for a pumping system having a double poppet means for sealing when in a closed position and for throttling fluid flow when in an open position.

An additional object of the invention is to provide a relief valve with separate sealing poppet means and orificing poppet means.

Another object of the invention is to provide a relief valve for a well treatment pumping system which will reseal when closed after actuation.

Additional objects and advantages of the invention will become apparent as the following detailed description of the preferred embodiments is read in conjunction with the drawings which illustrate such preferred embodiments.

DESCRIPTION OF THE PREFERRED EMBODIMENTS

Figure 1:
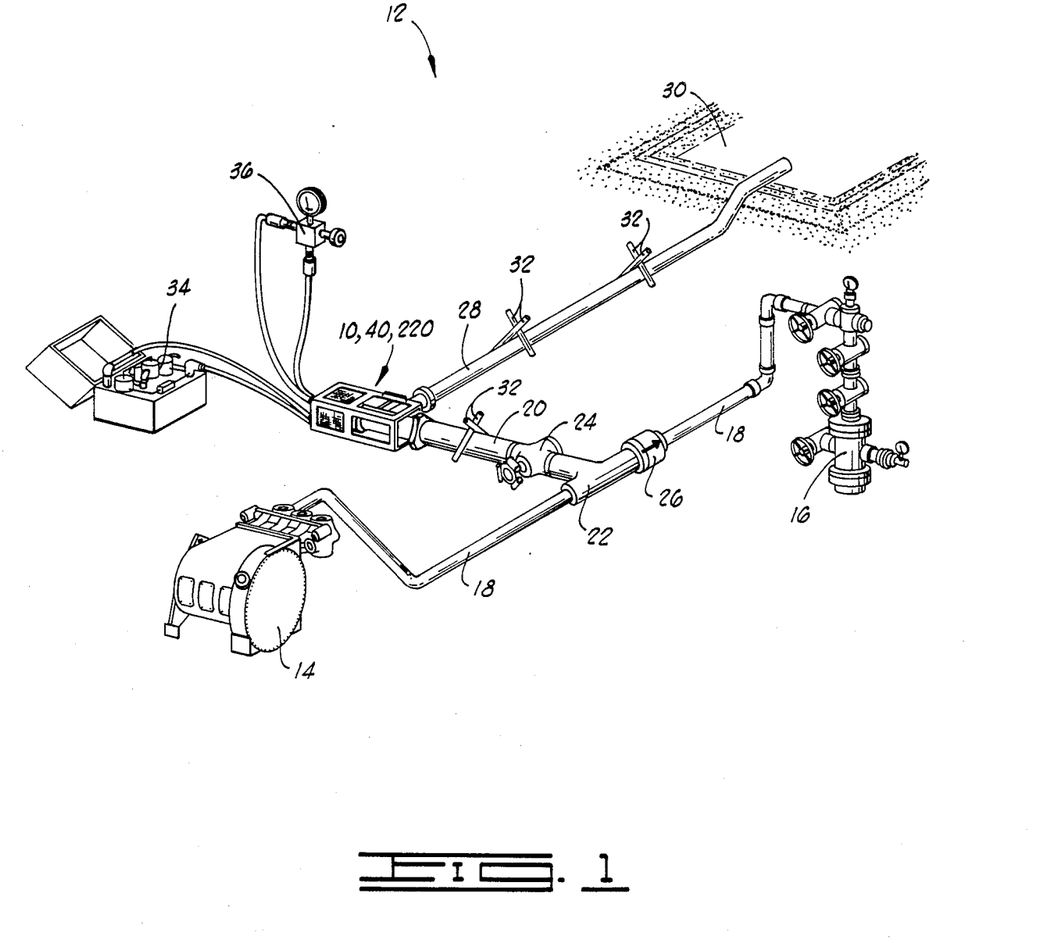
FIG. 1 shows a typical pumping system for oil and well gas fracturing, utilizing the double poppet relief valve of the present invention.

Referring now to the drawings, and more particularly to FIG. 1, the double poppet relief valve of the present invention is shown and generally designated by the numeral 10 as forming part of a pumping system 12 for an oil or gas well fracturing operation. Pumping system 12 also includes a pump 14 connected to a wellhead 16 by a pump discharge line 18.

Relief valve 10 is connected to discharge line 18 by relief valve inlet line 20 by means of a tee 22. A manual shutoff valve 24 may be provided in relief valve inlet line 20 so that relief valve 10 may be isolated from discharge line 18 when necessary for repair or installation. A back check valve 26 may be placed in discharge line 18 downstream from tee 22 as desired.

Relief valve 10 exhausts into relief valve discharge line 28 which flows the bypassed fluid from relief valve 10 into a pit 30. Stakes 32 of a kind known in the art may be used to hold relief valve inlet line 20 and relief valve discharge line 28 adjacent a ground surface as desired.

A pressure source, such as hydraulic or pneumatic power unit 34 is connected to relief valve 10. Other devices such as optional remote control unit 36 of a kind known in the art may also be connected to relief valve 10. The manner in which the hydraulic or pneumatic pressure is used in the operation of relief valve 10 will be discussed in further detail herein.

A PRIOR ART RELIEF VALVE

Figure 2:
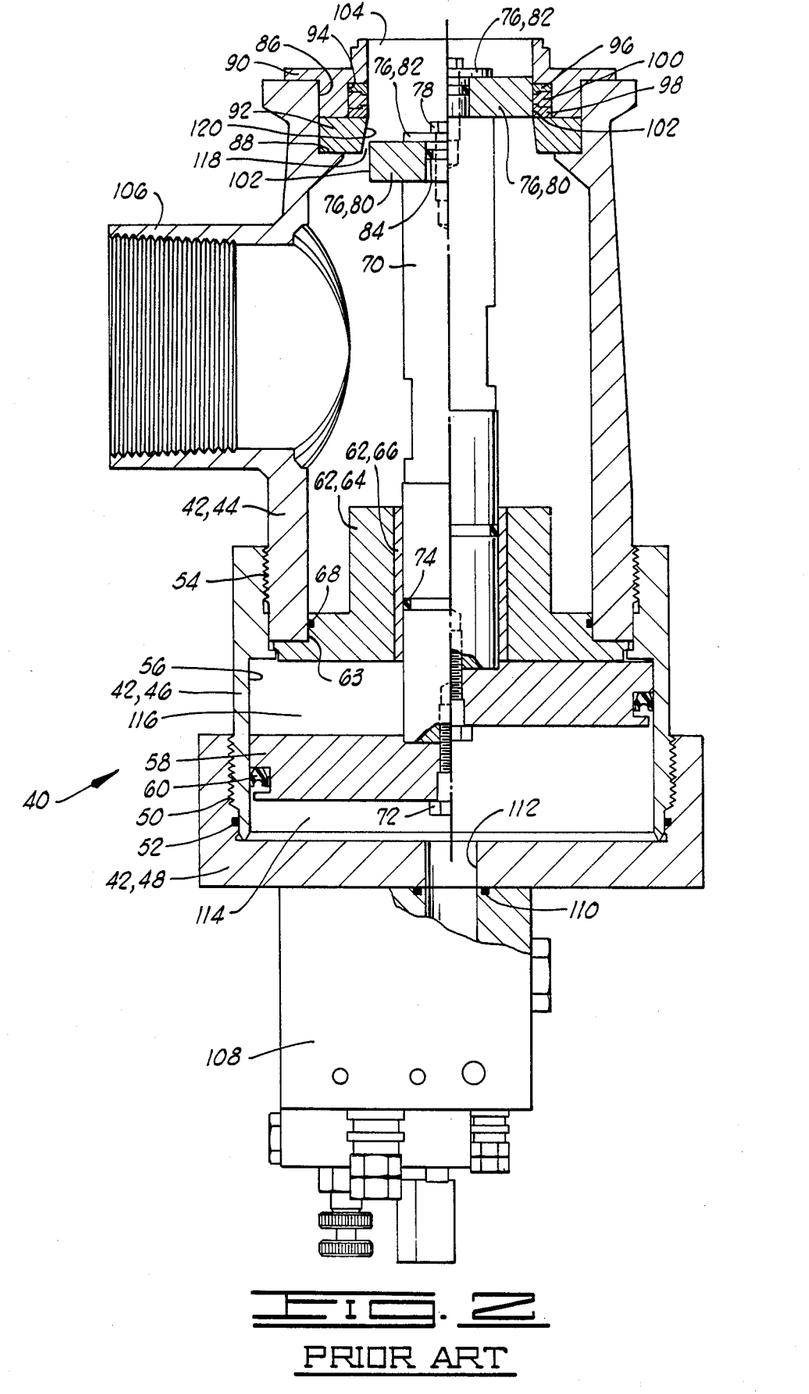
FIG. 2 shows a cross-sectional view of a prior art relief valve in both open and closed positions.

Referring now to FIG. 2, details of a prior art relief valve 40 are shown. The upper portion of FIG. 2 shows prior art relief valve 40 in an open position, and the lower portion of FIG. 2 shows the prior art relief valve in a closed position. Relief valve 40 is connected to pumping system 12 in the same manner as the present invention, as indicated in FIG. 1.

Prior art relief valve 40 has an outer housing means 42 generally including a body 44, a cylinder 46 and a cylinder cover 48. Cylinder cover 48 is connected to cylinder 46 at threaded connection 50, and sealing means, such as O-ring 52, provide sealing engagement between cylinder 46 and cylinder cover 48. Cylinder 46 is connected to body 44 at threaded connection 54.

Cylinder 46 defines a bore 56 therein in which is slidably disposed a piston 58. A piston ring 60 provides sliding, sealing engagement between piston 58 and bore 56 of cylinder 46.

One end of cylinder 46 is closed by cylinder cover 48, and the opposite end is closed by a bearing guide assembly 62 which fits in end 63 of body 44. Bearing guide assembly 62 includes a bearing guide 64 with a cylindrical bearing 66 disposed along a central axis thereof. It will be seen that bearing guide assembly 62 is disposed adjacent body 44, and sealing means, such as O-ring 68, provide sealing engagement therebetween.

A push rod 70 is slidably disposed through bearing 66 and is attached to piston 58 by fastener means, such as bolt 72. Sealing means, such as seal ring 74, provide sealing engagement between push rod 70 and bearing 66.

Push rod 70 is substantially coaxial with body 44 and extends away from bearing guide assembly 62 into body 44 in a direction opposite piston 58.

A poppet assembly 76 is attached to an opposite end of push rod 70 from piston 58 by fastener means, such as bolt 78. Poppet assembly 76 includes a poppet 80 and a washer 82. Sealing means, such as O-ring 84, provides sealing engagement between poppet assembly 76 and push rod 70.

Body 44 has an end 86 opposite end 63 thereof and coaxial therewith. Adjacent end 86 is a transverse shoulder 88. A seat retainer 90 and a backup ring 92 are disposed in end 86 of body 44 such that backup ring 92 bears against shoulder 88. It will be seen that seat retainer 90 and backup ring 92 define a substantially annular seal groove 94. Disposed in seal groove 94 are an outer seat adapter 96, an inner seat adapter 98 and a poppet seat 100 disposed between the seat adapters. Poppet seat 100 is designed for sealing engagement with an outer circumferential surface 102 on poppet 80.

OPERATION OF THE PRIOR ART RELIEF VALVE

As will be seen more clearly herein, seat retainer 90 forms an inlet 104 into body 44 of housing means 42. An outlet 106 formed in body 44 provides an outlet means for housing means 42. Attached to an outer side of cylinder cover 48 is a pressure manifold assembly 108.

Sealing means such as O-ring 110 provides sealing engagement between manifold assembly 108 and cylinder cover 48. Cylinder cover 48 defines a bore 112 therethrough which is in fluid communication with manifold assembly 108.

Manifold assembly 108 is connected to hydraulic or pneumatic power unit 34 such that a pressure source is provided to an outer chamber portion 114 in cylinder 46. It will be seen that piston ring 60 sealingly separates outer chamber portion 114 from an inner chamber portion 116 on the opposite side of piston 58.

When in the closed position, as indicated by the lower half of FIG. 2, piston 58 is adjacent bearing guide assembly 62, and poppet assembly 76 is positioned in inlet opening 104 such that outer surface 102 of poppet 80 is in sealing engagement with poppet seat 100.

It will be seen by those skilled in the art that when a force exerted by the hydraulic or pneumatic pressure in outer chamber portion 114 of cylinder 46 acting against the cross-sectional area of cylinder 46 is greater than a force exerted by the pressure in inlet opening 104 acting against the cross-sectional area of inlet opening 104, the relief valve will remain in the closed position shown in the lower half of FIG. 2. That is, when the pressure from power unit 34 acting on the area of cylinder 46 is greater than pump discharge pressure acting on the area of inlet opening 104, prior art relief valve 40 will be closed.

The pressure supplied to outer chamber portion 114 from power unit 34 is set at a predetermined level such that the pump pressure acting on poppet assembly 76 will open relief valve 40 at a preselected pump discharge or system pressure. When the pump discharge or system pressure acting on poppet assembly 76 exceeds the pressure acting on piston 58, poppet assembly 76, push rod 70 and piston 58 will move to the left, as viewed in FIG. 2, just enough to allow fluid pressure in inlet opening 104 to be relieved. As poppet assembly 76 moves to the open position shown in the upper portion of FIG. 2, an annular orificing or throttling flow passage is formed between poppet 80 and chamfered surface 120 of backup ring 92. The pressure acting on piston 58 maintains a constant force thereon, and the result is that fluid from relief valve inlet line 20 is throttled through passage 118 so that poppet assembly 76 will remain in the open position until the pressure in relief valve inlet line 20 is sufficiently relieved.

The fluid flowing through passage 118 has relatively high velocity. Relief valve 40 works fairly well on clean fluids, but erosion of poppet 80 occurs on dirty fluids, and particularly proppant-laden slurries. The result is that the valve will not reseal after relieving on such fluids, and the system must then be operated with a leaking relief valve, or the relief valve must be disassembled and repaired. Either of these is an undesirable result.

THE PRESENT INVENTION

Figure 3:
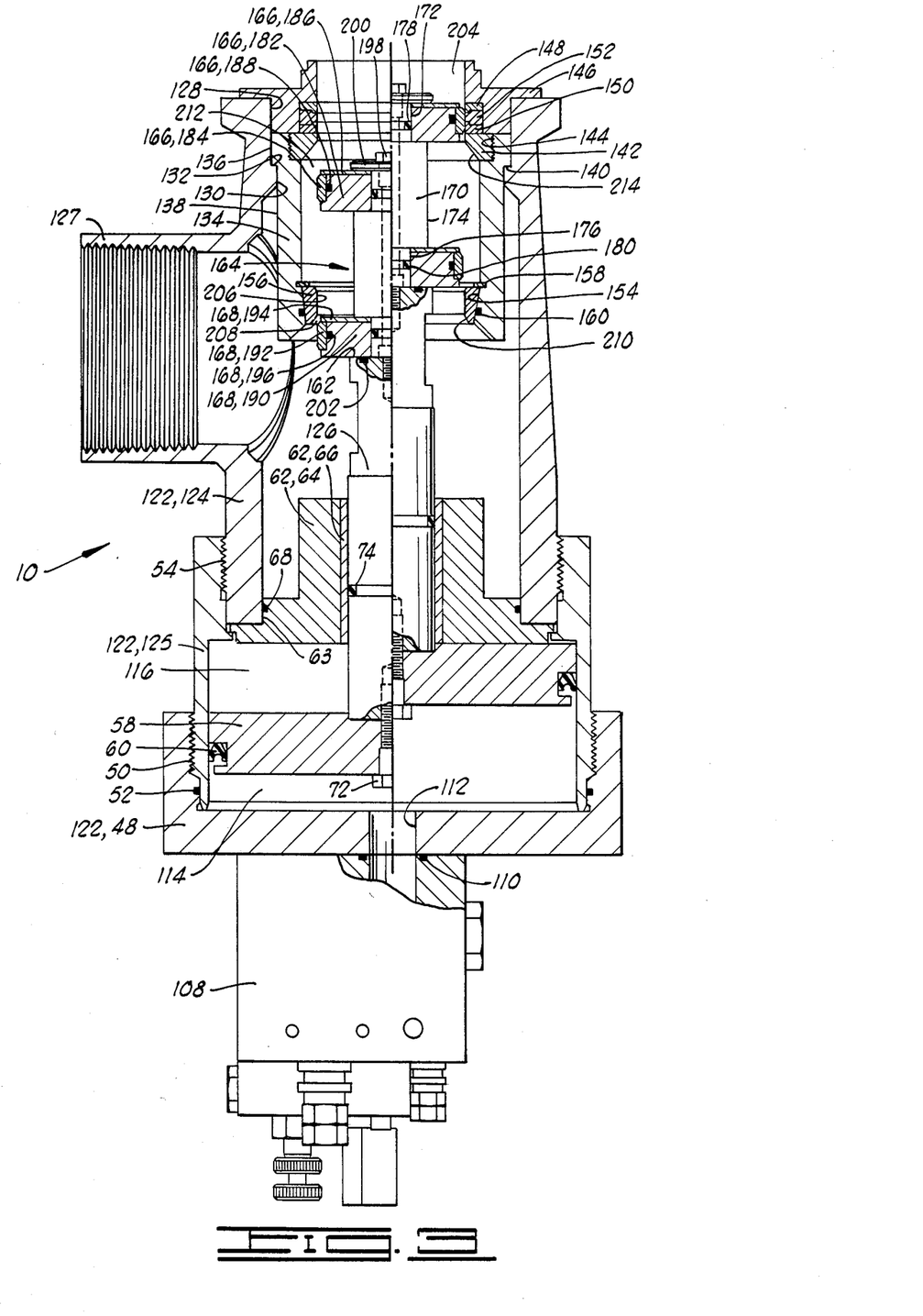
FIG. 3 illustrates the double poppet relief valve of the present invention, shown in open and closed positions.

Referring now to FIG. 3, details of a first embodiment of relief valve 10 of the present invention are shown. Relief valve 10 is shown in a closed position in the lower half of FIG. 3 and an open position in the upper half of FIG. 3.

In a manner similar to prior art relief valve 40, relief valve 10 includes a housing means 122 comprising a body 124 and cylinder 125 similar to body 44 and cylinder 46 in the prior art valve, and cylinder cover 48 which is substantially identical to the corresponding component in prior art valve 40. Cylinder 125 preferably has a longer stoke than cylinder 46. In FIG. 3, the same reference numerals have been used when the components of relief valve 10 are essentially identical to those of prior art relief valve 40.

Body 124 has an outlet 127 which is the same as outlet 106 on body 44 of prior art relief valve 40. Essentially, all of the components to the left of outlet 127, as shown in FIG. 3, are identical to that of prior art valve 40, except is shorter than push rod 70 in the prior art valve. Push rod 126 is slidably disposed through bearing 66 in bearing guide assembly 62 with sealing provided by a sealing means, such as 0-ring 74, and piston 58 is slidably disposed in cylinder 125 with sealing engagement provided by piston ring 60. Piston 58 is attached to push rod 126 in the same manner as in prior art relief valve 40. Outer chamber portion 114 is again provided with pressure from power unit 34 through manifold assembly 108.

The poppet portion of relief valve 10 is totally different from that of the prior art. Body 124 defines a first bore 128 and a second bore 130 in the end thereof opposite piston 58. A small annular shoulder 132 extends between first bore 128 and second bore 130.

A poppet sleeve 134 is disposed in body 124. Poppet sleeve 134 has a first outside diameter 136 which is adjacent first bore 128 in body 124 and a second outside diameter 138 which is adjacent second bore 130 in the body. Poppet sleeve 134 also has an annular shoulder 140, extending between first and second bores 136 and 138, which engages shoulder 132 in body 124. At the outer end of poppet sleeve 134 is an annular backup ring 142 which is connected to the poppet sleeve at threaded connection 144.

Poppet sleeve 134 is held in place in body 124 by a seat retainer 146. Seat retainer 146 extends into first bore 128 of body 124, and it will be seen that seat retainer 146 and backup ring 142 form a seat groove in which are positioned outer seat adapter 148, inner seat adapter 150 and poppet seat 152. Although new reference numerals have been used for the seat retainer, outer seat adapter, inner seat adapter and poppet seat in relief valve 10, it should be understood that these components could be essentially identical to those in prior art relief valve 40.

At the inner end of poppet sleeve 134 is a tapered inner surface 154 against which is positioned an orificing wear insert 156. Wear insert 156 is held in place by means such as retainer ring 158. Sealing means, such as 0-ring 160, provide sealing engagement between wear insert 156 and tapered surface 154 of poppet sleeve 134.

Attached to outer end 162 of push rod 126 is a double poppet means, generally designated by the numeral 164. Double poppet means 164 generally comprises a sealing poppet assembly 166, an orificing poppet assembly 168, and a poppet spacer 170. Poppet spacer 170 has a first diameter 172, an enlarged second diameter 174 and a third diameter 176. Sealing poppet assembly 166 fits on first diameter 172 of poppet spacer 170 with sealing engagement provided therebetween by sealing means, such as 0-ring 178. Similarly, orificing poppet assembly 168 fits on third diameter 176 of poppet spacer 170 with sealing engagement provided therebetween by sealing means, such as 0-ring 180.

Sealing poppet assembly 166 comprises a sealing poppet body 182, a sealing poppet ring 184, a poppet cover 186 and sealing means, such as 0-ring 188, to provide sealing engagement between sealing poppet body 182 and sealing poppet ring 184. Similarly, orificing poppet assembly 168 comprises an orificing poppet body 190, an orificing poppet ring 192, a poppet cover 194 and sealing means, such as O-ring 196, for providing sealing engagement between orificing poppet body 190 and orificing poppet ring 192. In one embodiment, orificing poppet assembly 168 may be larger than sealing poppet assembly 166 to give relief valve 10 a corresponding blow-down. Blow-down is the reduction in dynamic or flowing pressure below the relief pressure which is required before the valve will reclose. For example, if orificing poppet assembly 168 has a cross-sectional area approximately ten percent greater than that of sealing poppet assembly 166, the pressure must decrease by approximately ten percent below the relief pressure before the valve will start to close. This blow-down feature will prevent the valve from closing while pump 14 is still pumping at the relief pressure. In another embodiment, sealing poppet assembly 166 and orificing poppet assembly 168 may be identical if desired so that there is no blow-down feature.

Double poppet means 164 is connected to end 162 of push rod 126 by bolt 198 and washer 200. Bolt 198 extends through poppet spacer 170 and is threadingly engaged with push rod 126. Sealing means, such as O-ring 202, provide sealing engagment between end 162 of push rod 126 and orificing poppet assembly 168.

OPERATION OF THE PRESENT INVENTION

When relief valve 10 is in the closed position shown in the lower half of FIG. 3, piston 58 is adjacent bearing guide assembly 62, in a manner substantially identical to the prior art relief valve 40, and sealing poppet ring 184 of sealing poppet assembly 166 is in sealing engagement with poppet seat 152. When in this closed position, it will be seen that orificing poppet assembly 168 is spaced to the outer side of wear insert 156.

Seat retainer 146 defines an inlet 204 into body 124, and as already mentioned, body 124 has an outlet 127. Inlet 204 and outlet 127 are connected to pumping system 12 in the manner already described for prior art relief valve 40.

When the force exerted by the pump discharge pressure acting on the cross-sectional area of inlet 204 exceeds the force exerted by the pressure acting on the cross-sectional area of cylinder 125, relief valve 10 will open. As sealing poppet assembly 166 moves inwardly, the annular, outer surface of orificing poppet ring 192 on orificing poppet assembly 168 moves adjacent, and in close relationship to, annular inside surface 206 of wear insert 156. Pressure then acts on orificing poppet assembly 168 so that the orificing poppet assembly is quickly moved further inwardly with respect to wear ring 156 such that an annular, throttling or orificing passage 208 is defined between orificing poppet assembly 168 and chamfered inner orificing surface 210 of wear insert 156. Fluid throttling occurs through orificing passage 208 in a manner similar to prior art relief valve 40. However, when orificing poppet assembly 168 is in the throttling or orificing position shown in the upper portion of FIG. 3, it will be seen that sealing poppet assembly 166 is spaced well away from backup ring 142. In other words, an annular flow passage 212 is defined between sealing poppet assembly 166 and chamfered inner surface 214 of backup ring 142. As previously indicated, cylinder 125 has a longer stroke than that in prior art relief valve 40. This longer stroke allows sealing poppet assembly 166 to be moved an adequate distance from backup ring 142.

The cross-sectional area of passage 212 is significantly greater than the cross-sectional area of orificing passage 208. That is, the fluid velocity through passage 212 is much lower than the fluid velocity through orificing passage 208. The result is that wear on sealing poppet assembly 166 is significantly reduced compared to the prior art because the fluid flow velocity thereacross is so much less. Because of this, when relief valve 10 is reclosed, poppet ring 184 of sealing poppet assembly 166 will reseal against poppet seat 152.

Because of the unique dual poppet design, the majority of wear occurs on orificing poppet assembly 168 which is not required to seal. Because the wear on sealing poppet assembly 166 is minimized, relief valve 10 may be used several times before it is necessary to repair it. This is a significant improvement over prior art relief valve 40 which generally must be repaired after one use. Not only is the cost of repair of relief valve 10 reduced, the fact that it reseals provides a better pumping system because the resealing feature provides that there is no leakage after cycling of the valve.

ALTERNATE EMBODIMENT

Figure 4:
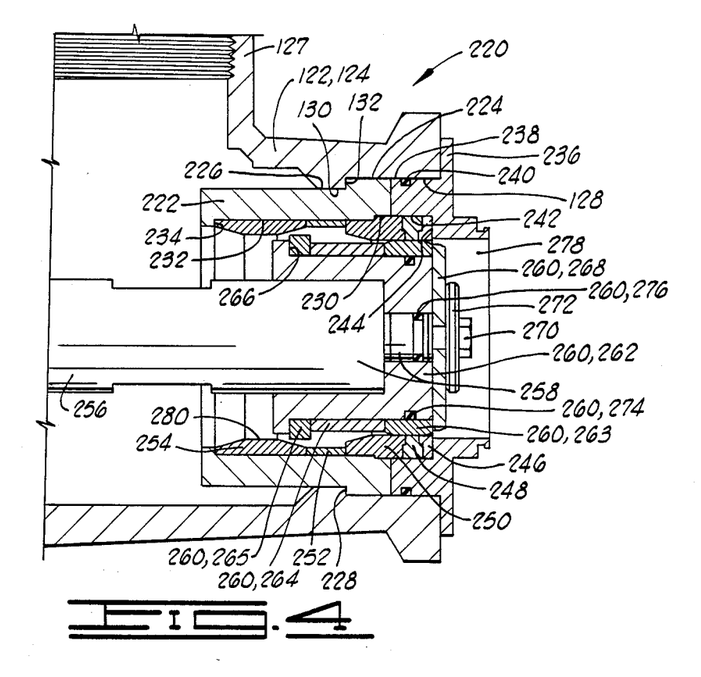
FIG. 4 shows an alternate embodiment of the relief valve of the present invention in a closed position.

Referring now to FIG. 4, an alternate embodiment of the present invention is shown in a closed position, and generally designated by the numeral 220. Alternate embodiment relief valve 220 is shown in an open position in FIG. 5. Relief valve 220 is installed in pumping system 12 in the same manner as first embodiment relief valve 10, as indicated in FIG. 1. Alternate embodiment relief valve 220 includes a housing means 122 comprising a body 124 with an outlet 127 thereon. The components not shown in FIG. 4 are the same as in first embodiment relief valve 10.

In alternate relief valve 220, an alternate poppet sleeve 222 is disclosed in body 124. Poppet sleeve 222 has a first diameter 224 disposed adjacent first bore 128 in body 124 and a second diameter 226 disposed adjacent second bore 130 in body 124. A shoulder 228 between diameters 224 and 226 on poppet sleeve 222 bears against shoulder 132 in body 124. Poppet sleeve 222 defines a first bore 230, a second bore 232 and an inwardly directed shoulder 234 at the inner end of second bore 232.

A seat retainer 236 holds poppet sleeve 222 in place. Seat retainer 236 has a diameter 238 adjacent first bore 128 in body 124. Sealing means, such as O-ring 240, may be provided between seat retainer 236 and body 124. Such sealing means could also be used in first embodiment relief valve 10. Seat retainer 236 also defines a bore 242 therein, substantially aligned with first bore 230 in poppet sleeve 222, with an inwardly directed shoulder 244 on the outer end of bore 242. Positioned between shoulder 244 in seat retainer 236 and shoulder 234 in poppet sleeve 222 are a seat adapter 246, a poppet seat 248, a first wear insert 250, an insert spacer 252 and a second wear insert 254. Second wear insert 254 may also be referred to as an orificing wear insert 254.

A push rod 256 extends from piston 58 (not shown in FIG. 4) into body 124. Attached to outer end 258 of push rod 256 is an alternate double poppet means, generally designated by the numeral 260. Double poppet means 260 comprises a ring holder 262 which fits over end 258 of push rod 256, a sealing poppet ring 263, a ring spacer 264 and an orificing poppet ring 265 which bears against an outwardly directed shoulder 266 on ring holder 262. Also included in double poppet means 260 is a ring retainer or poppet cover 268 which engages the outermost end of sealing poppet ring 263. Double poppet means 260 is attached to end 258 of push rod 256 by fastener means such as bolt 270 and washer 272. Sealing means, such as 0-ring 274 provide sealing engagement between ring holder 262 and sealing poppet ring 263. Similarly, sealing means, such as 0-ring 276, provide sealing engagement between ring holder 262 and end 258 of push rod 256.

Operation Of The Alternate Embodiment

As with the other embodiment, seat retainer 236 provides an inlet 278 into body 124. As long as the force exerted by the pressure in outer chamber portion 114 acting on piston 58 exceeds the force exerted by the pressure in inlet 278 acting on the area of the inlet, alternate relief valve 220 will remain closed, as with the other relief valves discussed herein.

Figure 5:
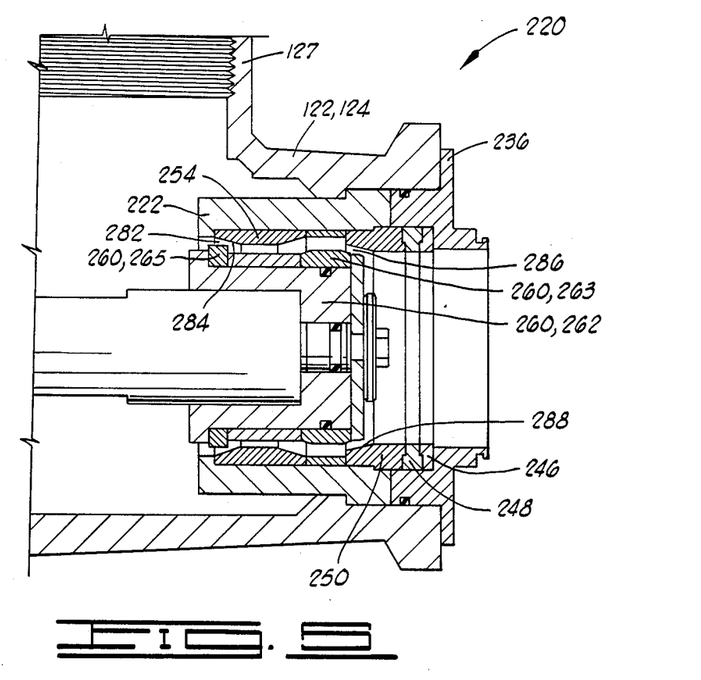
FIG. 5 shows the alternate embodiment in an open position.

Once the pressure in inlet 278 is sufficiently high, double poppet means 260 will move to the left as viewed in FIG. 4 in a manner similar to double poppet means 166 in first embodiment relief valve 10. As double poppet means 260 opens, orificing poppet ring 265 moves adjacent and in close relationship to annular inside surface 280 of second wear insert 254. The fluid pressure then quickly forces double poppet means 260 further to the left, as best seen in FIG. 5, such that an annular orificing passage 282 is formed between orificing poppet ring 265 and chamfered inner orificing surface 284 of second wear insert 254. It will be seen that sealing poppet ring 263 is moved away from first wear insert 250 such that an annular flow passage 286 is defined between sealing poppet ring 263 and chamfered surface 288 of first wear insert 250.

In a manner similar to first embodiment relief valve 10, passage 286 has a substantially larger area than orificing passage 282, such that the fluid flow velocity through passage 286 is much less than that through orificing passage 282. In this way, wear on sealing poppet ring 263 is minimized, and orificing is carried out by orificing poppet ring 265 and orificing surface 284 on wear insert 254. As with first embodiment relief valve 10, this means that sealing poppet ring 263 will reseal on poppet seat 248 when relief valve 220 is reclosed. The majority of the wear will occur on the surfaces adjoining orificing passage 282.

Also similar to first embodiment relief valve 10, orificing poppet ring 265 and sealing poppet ring 263 may be made the same size, or orificing poppet ring 265 may be made larger than sealing poppet ring 263 to provide a blow-down feature.

The various components in relief valves 10 and 220 may be made of hardened materials as desired to further minimize wear.

It will be seen, therefore, that the double poppet relief valve of the present invention is well adapted to carry out the ends and advantages mentioned as well as those inherent therein. While two presently preferred embodiments of the invention have been shown for the purposes of this disclosure, numerous changes in the arrangement and construction of parts may be made by those skilled in the art. All such changes are encompassed within the scope and spirit of the appended claims.

What is claimed is:

1. A relief valve comprising:

housing means for connecting to a pumping system; and double poppet means disposed in said housing means for sealing when in a closed position and for throttling fluid flow through said housing means when in an open position, said double poppet means comprising:

sealing poppet means for sealingly engaging a poppet seat located within said housing means when in said closed position; and orificing poppet means for throttling fluid flow adjacent an orificing surface located in said housing means such that pressure acting on said orificing poppet means moves said sealing poppet means to a fully open position.

2. The relief valve of claim 1 further comprising piston means for providing a force on said double poppet means in response to a pressure from a pressure source, said force tending to close said double poppet means.

3. The relief valve of claim 1 further comprising a push rod slidably disposed in said housing means; wherein:

said sealing poppet means is characterized by a sealing poppet body attached to said push rod; and said orificing poppet means is characterized by an orificing poppet body attached to said push rod and spaced from said sealing poppet body.

4. The relief valve of claim 3 further comprising a poppet spacer disposed between said sealing and orificing poppet bodies.

5. A relief valve comprising:

a housing comprising:
 a cylinder portion; and
 a body portion;

a piston slidably disposed in said cylinder;

a push rod attached to said piston and extending therefrom into said body portion;

a poppet sleeve disposed in said body portion and in communication with an inlet of said body portion, said poppet sleeve having an inner orificing surface disposed therein;

a poppet seal disposed adjacent said inlet of said body portion;

a sealing poppet assembly attached to said push rod and having a sealing surface adapted for sealing engagement with said poppet seat when in a closed position; and an orificing poppet assembly attached to said push rod and having an outer orificing surface thereon adapted for throttling, spaced relationship with said inner orificing surface such that fluid flowing from said inlet of said body portion is throttled through a passage defined between said inner and outer orificing surfaces whereby a pressure on said orificing poppet assembly acts to move said sealing poppet assembly to a fully open position.

6. The relief valve of claim 5 further comprising a poppet spacer disposed between said sealing and orificing poppet assemblies.

7. A relief valve comprising:

a housing comprising:
 a cylinder portion; and
 a body portion;

a piston slidably disposed in said cylinder;

a push rod attached to said piston and extending therefrom into said body portion;

a poppet sleeve disposed in said body portion and in communication with an inlet of said body portion, said poppet sleeve having an inner orificing surface disposed therein;

a poppet seat disposed adjacent said inlet of said body portion;

a ring holder attached to said push rod;

a sealing poppet ring disposed on said ring holder and having a sealing surface adapted for sealing engagement with said poppet seat when in a closed position;

an orificing poppet ring disposed on said ring holder and having an outer orificing surface thereon adapted for throttling, spaced relationship with said inner orificing surface when in an open position, such that fluid flowing from said inlet of said body portion is throttled through a passage defined between said inner and outer orificing surfaces.

8. The relief valve of claim 7 further comprising a ring spacer disposed between said sealing and orificing poppet rings.

9. Valve of claim 7 wherein said orificing poppet ring has a greater cross-sectional area than said sealing poppet ring.

10. The relief valve of claim 7 further comprising a wear insert disposed in said poppet sleeve, said inner orificing surface being defined on said wear insert.

11. The relief valve of claim 10 wherein:

said wear insert further defines an annular inner surface thereon; and said orificing poppet ring passes through said wear insert when moved from said closed position to said open position such that said annular inner surface and said outer orificing surface are in close, spaced relationship for a portion of the movement of said orificing poppet assembly.

12. A relief valve comprising:

housing means for connecting to a pumping system;

double poppet means disposed in said housing means for sealing when in a closed position and for throttling fluid flow through said housing means when in an open position, said double poppet means comprising:

sealing poppet means for sealingly engaging a poppet seat located within said housing means when in said closed position, said sealing poppet means being spaced from said poppet seat when in said open position; and orificing poppet means for throttling fluid flow adjacent an orificing surface located in said housing means when in said open position; and an inner surface located in said housing means such that an outer surface of said orificing poppet means passes said inner surface in closed relationship thereto as said double poppet means is moved from said closed position to said open position.

13. A relief valve housing:

housing means for connecting to a pumping system; and double poppet means disposed in said housing means for sealing when in a closed position and for throttling fluid flow through said housing means when in an open position, said double poppet means comprising:

sealing poppet means for sealingly engaging a poppet seat located within said housing means when in said closed position, said sealing poppet means being spaced from said poppet seal when in said open position; and orificing poppet means for throttling fluid flow adjacent an orificing surface located in said housing means when in said open position, said orificing poppet means having a cross-sectional area greater than said sealing poppet means.

14. A relief valve comprising:

housing means for connecting to a pumping system;

a push rod slidably disposed in said housing means;

a ring holder attached to said push rod; and double poppet means disposed in said housing means for sealing when in a closed position and for throttling fluid flow through said housing means when in an open position, said double poppet means comprising:

sealing poppet means for sealingly engaging a poppet seat located within said housing means when in said closed position, said sealing poppet means being spaced from said poppet seat when in said open position, and said sealing poppet means being characterized by a sealing poppet ring disposed around said ring holder; and orificing poppet means for throttling fluid flow adjacent an orificing surface located in said housing means when in said open position, said orificing poppet means being characterized by an orificing poppet ring disposed around said ring holder and spaced from said sealing poppet ring.

15. The relief valve of claim 14 further comprising a ring spacer disposed around said ring holder and between said sealing and orificing poppet rings.

16. A relief valve comprising:

a housing comprising:

a cylinder portion; and a body portion;

a piston slidably disposed in said cylinder;

a push rod attached to said piston and extending therefrom into said body portion;

a poppet sleeve disposed in said body portion and in communication with an inlet of said body portion, said poppet sleeve having an inner orificing surface disposed therein;

a poppet seat disposed adjacent said inlet of said body portion;

a sealing poppet assembly attached to said push rod and having a sealing surface adapted for sealing engagement with said poppet seat when in a closed position, said sealing poppet assembly comprising:

a sealing poppet body;

a sealing poppet ring positioned on said sealing poppet body; and a first poppet cover disposed adjacent said sealing poppet body and said sealing poppet ring; and an orificing poppet assembly attached to said push rod and having an orifice surface thereon adapted for throttling, spaced relationship with said inner orificing surface when in an open position, such that fluid flowing from said inlet of said body portion is throttled through a passage defined between said inner and outer orificing surfaces, said orificing poppet assembly comprising:

an orificing poppet body;

an orificing poppet ring positioned on said orificing poppet body; and a second poppet cover disposed adjacent said orificing poppet body and said orificing poppet ring.

17. A relief valve comprising:

a housing comprising:
  a cylinder portion; and
  a body portion;
a piston slidably disposed in said cylinder;
a push rod attached to said piston and extending therefrom into said body portion;
a poppet sleeve positioned in said body portion and in communication with an inlet of said body portion, said poppet sleeve having an inner orificing surface disposed therein;
a poppet seat disposed adjacent said inlet of said body portion;
a sealing poppet assembly attached to said push rod and having a sealing surface adapted for sealing engagement with said poppet seat when in a closed position; and
an orificing poppet assembly attached to said push rod and having an outer orificing surface thereon adapted for throttling, spaced relationship with said inner orificing surface when in an open position, such that fluid flowing from said inlet of said body portion is throttled through a passage defined between said inner and outer orificing surfaces, wherein said sealing and orificing poppet assemblies are substantially identical.

18. A relief valve comprising:
a housing comprising:
  a cylinder portion; and
  a body portion;
a piston slidably disposed in said cylinder;
a push rod attached to said piston and extending therefrom into said body portion;
a poppet sleeve disposed in said body portion and in communication with an inlet of said body portion, said poppet sleeve having an inner orificing surface disposed therein;
a poppet seat disposed adjacent said inlet of said body portion;
a sealing poppet assembly attached to said push rod and having a sealing surface adapted for sealing engagement with said poppet seat when in a closed position;
an orificing poppet assembly attached to said push rod and having an outer orificing surface thereon adapted for throttling, spaced relationship with said inner orificing surface when in an open position, such that fluid flowing from said inlet of said body portion is throttled through a passage defined between said inner and outer orificing surfaces; and
a wear insert disposed in said poppet sleeve, said inner orificing surface being defined on said wear insert.

19. The relief valve of claim 18 wherein:
said wear insert further defines an annular inner surface thereon; and
said orificing poppet assembly passes through said wear insert when moved from said closed position to said open position such that said annular inner surface and said outer orificing surface are in close, spaced relationship for a portion of the movement of said orificing poppet assembly.

* * * * *

UNITED STATES PATENT AND TRADEMARK OFFICE
CERTIFICATE OF CORRECTION

PATENT NO. : 4,850,392

DATED : July 25, 1989

INVENTOR(S) : J. Bradley Crump et al.

It is certified that error appears in the above-identified patent and that said Letters Patent is hereby corrected as shown below:

In the specification, column 6, line 10, after the word "except" insert therefore --for cylinder 125, as already noted, and push rod 126, which--.

In column 10, line 44, delete the word [seal] and insert therefore --seat--.

In column 11, line 22, change "Valve" to --The relief valve.

Signed and Sealed this

Seventeenth Day of July, 1990

Attest:

Attesting Officer

HARRY F. MANBECK, JR.

Commissioner of Patents and Trademarks